United States Patent
Cox et al.

(10) Patent No.: US 8,939,225 B2
(45) Date of Patent: Jan. 27, 2015

(54) INFLATOR-BASED FIRE SUPPRESSION

(75) Inventors: Matthew A. Cox, Centerville, UT (US);
Bradley W. Smith, Plain City, UT (US);
David W. Parkinson, North Ogden, UT (US)

(73) Assignee: Alliant Techsystems Inc., Arlington, VA (US)

( * ) Notice: Subject to any disclaimer, the term of this patent is extended or adjusted under 35 U.S.C. 154(b) by 845 days.

(21) Appl. No.: 12/899,961

(22) Filed: Oct. 7, 2010

(65) Prior Publication Data

US 2012/0085556 A1 Apr. 12, 2012

(51) Int. Cl.
| | |
|---|---|
| *A62C 35/00* | (2006.01) |
| *A62C 35/02* | (2006.01) |
| *A62C 13/00* | (2006.01) |
| *A62C 13/62* | (2006.01) |
| *A62C 5/00* | (2006.01) |
| *B60R 21/26* | (2011.01) |

(52) U.S. Cl.
CPC ....... *A62C 5/006* (2013.01); *B60R 2021/26017* (2013.01)
USPC ......... 169/72; 169/9; 169/12; 169/27; 169/71

(58) Field of Classification Search
USPC ............. 169/9, 11, 12, 27, 35, 44, 46, 54, 70, 169/71, 72, 78, 84
See application file for complete search history.

(56) References Cited

U.S. PATENT DOCUMENTS

| | | | |
|---|---|---|---|
| 1,839,658 A | 1/1932 | Dugas | |
| 2,744,816 A | 5/1956 | Hutchison | |
| 2,841,227 A | 7/1958 | Betzler | |
| 3,255,824 A | 6/1966 | Rodgers | |
| 3,524,506 A | 8/1970 | Weise | |
| 3,641,935 A | 2/1972 | Gawlick et al. | |

(Continued)

FOREIGN PATENT DOCUMENTS

| | | |
|---|---|---|
| DE | 19546528 A1 | 6/1997 |
| DE | 196 02 695 A1 | 7/1997 |

(Continued)

OTHER PUBLICATIONS

Co-pending U.S. Appl. No. 12/723,275, "Additives for Liquid-Cooled Inflators," filed Mar. 12, 2010.

(Continued)

*Primary Examiner* — Ryan Reis
(74) *Attorney, Agent, or Firm* — TraskBritt

(57) ABSTRACT

A fire suppression apparatus that includes a housing defining a first chamber containing a gas generant. The apparatus further includes an initiator operatively associated with the first chamber and in reaction initiating communication with the gas generant. The initiator, upon actuation, acts to ignite at least some of the gas generant to form gas. The housing further defines a second chamber adjacently disposed to the first chamber. The second chamber contains an endothermically-alterable material and a piston assembly including a piston. Upon actuation, the piston moves to expel at least a portion of the endothermically-alterable material from the second chamber such that the expelled endothermically-alterable material contacts and cools gas formed by the ignition of the gas generant. The housing further has at least one discharge opening to permit cooled gas to exit the housing. Corresponding or associated methods for suppressing a fire are also provided.

19 Claims, 8 Drawing Sheets

(56) References Cited

U.S. PATENT DOCUMENTS

| | | | |
|---|---|---|---|
| 3,701,256 A | 10/1972 | Pelham et al. | |
| 3,741,585 A | 6/1973 | Hendrickson et al. | |
| 3,806,461 A | 4/1974 | Hendrickson et al. | |
| 3,836,076 A | 9/1974 | Conrad et al. | |
| 3,889,757 A | 6/1975 | Dunn | |
| 3,972,545 A | 8/1976 | Kirchoff et al. | |
| 3,972,820 A | 8/1976 | Filter et al. | |
| 4,064,944 A | 12/1977 | McClure | |
| 4,067,392 A | 1/1978 | Rich | |
| 4,113,019 A | 9/1978 | Sobolev et al. | |
| 4,224,994 A | 9/1980 | Tone et al. | |
| 4,448,577 A | 5/1984 | Paczkowski | |
| 4,505,336 A | 3/1985 | Thevis et al. | |
| 4,601,344 A | 7/1986 | Reed et al. | |
| 4,616,694 A | 10/1986 | Hsieh | |
| 4,807,706 A | 2/1989 | Lambertsen et al. | |
| 4,817,828 A | 4/1989 | Goetz | |
| 4,890,860 A | 1/1990 | Schneiter | |
| 4,909,549 A | 3/1990 | Poole | |
| 4,931,111 A | 6/1990 | Poole | |
| 4,998,751 A | 3/1991 | Paxton et al. | |
| 5,035,757 A | 7/1991 | Poole | |
| 5,038,866 A | 8/1991 | Kern et al. | |
| 5,060,867 A | 10/1991 | Luxton et al. | |
| 5,109,772 A | 5/1992 | Cunningham et al. | |
| 5,423,384 A | 6/1995 | Galbraith et al. | |
| 5,425,886 A | 6/1995 | Smith | |
| 5,429,691 A | 7/1995 | Hinshaw et al. | |
| 5,439,537 A | 8/1995 | Hinshaw et al. | |
| 5,441,114 A | 8/1995 | Spector et al. | |
| 5,449,041 A | 9/1995 | Galbraith | |
| 5,465,795 A | 11/1995 | Galbraith et al. | |
| 5,495,893 A | 3/1996 | Roberts et al. | |
| 5,520,826 A | 5/1996 | Reed | |
| 5,531,941 A | 7/1996 | Poole | |
| 5,538,568 A | 7/1996 | Taylor et al. | |
| 5,542,704 A | 8/1996 | Hamilton et al. | |
| 5,544,687 A | 8/1996 | Barnes et al. | |
| 5,588,493 A | 12/1996 | Spector et al. | |
| 5,609,210 A | 3/1997 | Galbraith et al. | |
| 5,610,359 A | 3/1997 | Spector et al. | |
| 5,613,562 A | 3/1997 | Galbraith et al. | |
| 5,673,935 A | 10/1997 | Hinshaw et al. | |
| 5,725,699 A | 3/1998 | Hinshaw et al. | |
| 5,735,118 A | 4/1998 | Hinshaw et al. | |
| 5,739,460 A | 4/1998 | Knowlton et al. | |
| 5,762,145 A | 6/1998 | Bennett | |
| 5,772,243 A | 6/1998 | Green et al. | |
| 5,783,773 A | 7/1998 | Poole et al. | |
| 5,820,160 A | 10/1998 | Johnson et al. | |
| 5,845,716 A * | 12/1998 | Birk | 169/85 |
| 5,845,933 A | 12/1998 | Walker et al. | |
| 5,848,652 A | 12/1998 | Bennett | |
| 5,861,106 A | 1/1999 | Olander | |
| 5,865,257 A | 2/1999 | Kozyrev et al. | |
| 5,876,062 A | 3/1999 | Hock | |
| 5,882,036 A | 3/1999 | Moore et al. | |
| 5,884,710 A | 3/1999 | Barnes et al. | |
| 5,918,679 A | 7/1999 | Cramer et al. | |
| 5,957,210 A | 9/1999 | Cohrt et al. | |
| 5,985,060 A | 11/1999 | Cabrera et al. | |
| 5,992,528 A * | 11/1999 | Parkinson et al. | 169/6 |
| 5,992,530 A | 11/1999 | Sundholm et al. | |
| 5,992,881 A * | 11/1999 | Faigle | 280/737 |
| 5,996,699 A | 12/1999 | Sundholm | |
| 6,012,533 A | 1/2000 | Cramer et al. | |
| 6,016,874 A | 1/2000 | Bennett | |
| 6,019,177 A | 2/2000 | Olander | |
| 6,019,861 A | 2/2000 | Canterberry et al. | |
| 6,024,889 A | 2/2000 | Holland et al. | |
| 6,039,347 A | 3/2000 | Maynard | |
| 6,039,820 A | 3/2000 | Hinshaw et al. | |
| 6,045,637 A | 4/2000 | Grzyll | |
| 6,045,638 A | 4/2000 | Lundstrom | |
| 6,065,774 A | 5/2000 | Cabrera | |
| 6,076,468 A * | 6/2000 | DiGiacomo et al. | 102/530 |
| 6,077,372 A | 6/2000 | Mendenhall et al. | |
| 6,082,464 A | 7/2000 | Mitchell et al. | |
| 6,086,693 A | 7/2000 | Mendenhall et al. | |
| 6,089,326 A | 7/2000 | Drakin | |
| 6,093,269 A | 7/2000 | Lundstrom et al. | |
| 6,095,559 A | 8/2000 | Smith et al. | |
| 6,096,147 A | 8/2000 | Taylor et al. | |
| 6,116,348 A | 9/2000 | Drakin | |
| 6,123,359 A | 9/2000 | Cabrera et al. | |
| 6,132,480 A | 10/2000 | Barnes et al. | |
| 6,136,114 A | 10/2000 | Johnson et al. | |
| 6,143,104 A | 11/2000 | Blomquist | |
| 6,164,383 A | 12/2000 | Thomas | |
| 6,196,583 B1 * | 3/2001 | Ruckdeschel et al. | 280/736 |
| 6,202,755 B1 | 3/2001 | Hardge | |
| 6,217,788 B1 | 4/2001 | Wucherer et al. | |
| 6,224,099 B1 | 5/2001 | Nielson et al. | |
| 6,250,072 B1 | 6/2001 | Jacobson et al. | |
| 6,257,341 B1 | 7/2001 | Bennett | |
| 6,287,400 B1 | 9/2001 | Burns et al. | |
| 6,314,754 B1 | 11/2001 | Kotliar | |
| 6,328,906 B1 | 12/2001 | Lundstrom et al. | |
| 6,334,315 B1 | 1/2002 | Kotliar | |
| 6,371,213 B1 * | 4/2002 | Smith et al. | 169/73 |
| 6,371,384 B1 | 4/2002 | Garcia | |
| 6,401,487 B1 | 6/2002 | Kotliar | |
| 6,416,599 B1 | 7/2002 | Yoshikawa et al. | |
| 6,418,752 B2 | 7/2002 | Kotliar | |
| 6,435,552 B1 | 8/2002 | Lundstrom et al. | |
| 6,474,684 B1 | 11/2002 | Ludwig et al. | |
| 6,481,746 B1 | 11/2002 | Hinshaw et al. | |
| 6,502,421 B2 | 1/2003 | Kotliar | |
| 6,513,602 B1 | 2/2003 | Lewis et al. | |
| 6,557,374 B2 | 5/2003 | Kotliar | |
| 6,560,991 B1 | 5/2003 | Kotliar | |
| 6,599,380 B2 | 7/2003 | Zeuner et al. | |
| 6,601,653 B2 | 8/2003 | Grabow et al. | |
| 6,605,233 B2 | 8/2003 | Knowlton et al. | |
| 6,612,243 B2 | 9/2003 | Italiane et al. | |
| 6,634,433 B2 | 10/2003 | Kim et al. | |
| 6,739,399 B2 | 5/2004 | Wagner et al. | |
| 6,851,483 B2 | 2/2005 | Olander | |
| 6,935,433 B2 | 8/2005 | Gupta | |
| 6,942,249 B2 | 9/2005 | Iwai et al. | |
| 6,981,555 B2 | 1/2006 | Smith et al. | |
| 6,990,905 B1 | 1/2006 | Manole et al. | |
| 7,028,782 B2 | 4/2006 | Richardson | |
| 7,059,633 B2 * | 6/2006 | Wang et al. | 280/737 |
| 7,073,820 B2 | 7/2006 | McCormick | |
| 7,156,184 B2 | 1/2007 | Wagner | |
| 7,337,856 B2 | 3/2008 | Lund et al. | |
| 7,451,829 B2 | 11/2008 | Thompson | |
| 7,455,119 B2 | 11/2008 | Thompson | |
| 7,597,153 B2 | 10/2009 | Thompson | |
| 7,770,924 B2 * | 8/2010 | Cox et al. | 280/741 |
| 7,845,423 B2 | 12/2010 | Lund et al. | |
| 8,162,350 B1 | 4/2012 | Parkinson et al. | |
| 8,408,322 B2 | 4/2013 | Blau et al. | |
| 2002/0007886 A1 | 1/2002 | Neidert | |
| 2002/0020536 A1 | 2/2002 | Bennett | |
| 2002/0137875 A1 | 9/2002 | Reed et al. | |
| 2002/0195181 A1 | 12/2002 | Lundstrom | |
| 2004/0089460 A1 | 5/2004 | Richardson | |
| 2004/0145166 A1 | 7/2004 | Smith | |
| 2004/0173922 A1 | 9/2004 | Barnes | |
| 2005/0115721 A1 | 6/2005 | Blau et al. | |
| 2005/0139365 A1 | 6/2005 | Richardson et al. | |
| 2005/0150665 A1 * | 7/2005 | Wierenga et al. | 169/85 |
| 2005/0189123 A1 | 9/2005 | Richardson et al. | |
| 2005/0235863 A1 | 10/2005 | Stevens | |
| 2005/0257866 A1 | 11/2005 | Williams et al. | |
| 2006/0278409 A1 | 12/2006 | Blau et al. | |
| 2008/0128145 A1 | 6/2008 | Butz et al. | |
| 2010/0013201 A1 * | 1/2010 | Cox et al. | 280/741 |
| 2010/0170684 A1 | 7/2010 | Richardson et al. | |
| 2010/0230942 A1 | 9/2010 | Rose et al. | |

(56) References Cited

U.S. PATENT DOCUMENTS

| | | | |
|---|---|---|---|
| 2010/0307775 A1 | 12/2010 | Robbins et al. | |
| 2011/0226493 A1 | 9/2011 | Blau et al. | |
| 2012/0085556 A1 | 4/2012 | Cox et al. | |

FOREIGN PATENT DOCUMENTS

| | | | |
|---|---|---|---|
| DE | 19717044 A1 | 10/1997 | |
| EP | 0784998 A2 | 7/1997 | |
| EP | 0956883 A1 | 11/1999 | |
| EP | 1767248 A1 | 3/2007 | |
| GB | 1219363 A | 1/1971 | |
| JP | 09500296 A | 1/1997 | |
| JP | 2001-276273 A | 10/2001 | |
| JP | 2001518046 A | 10/2001 | |
| JP | 2001346898 A | 12/2001 | |
| JP | 2002160992 A | 6/2002 | |
| JP | 2002-291939 A | 10/2002 | |
| JP | 2004-321272 A | 11/2004 | |
| JP | 2007-252731 A | 10/2007 | |
| JP | 2009-072594 A | 4/2009 | |
| JP | 5248640 B2 | 7/2013 | |
| WO | 9315793 A1 | 8/1993 | |
| WO | 9500205 A1 | 1/1995 | |
| WO | 9846529 A1 | 10/1998 | |
| WO | 9901180 A2 | 1/1999 | |
| WO | 0006424 A1 | 2/2000 | |
| WO | 0015305 A1 | 3/2000 | |
| WO | 03024534 A1 | 3/2003 | |
| WO | 2004028642 A1 | 4/2004 | |
| WO | 2004091729 A1 | 10/2004 | |
| WO | WO 2008/140441 A1 | 11/2008 | |

OTHER PUBLICATIONS

Co-pending U.S. Appl. No. 12/723,331, "Multi-Stage Inflator," filed Mar. 12, 2010.

Concurrently filed co-pending Patent Application, David W. Parkinson et al., titled, "Gas Generator,".

http://www.navair.navy.mil/techTrans/index.cfm?map=local.ccms.view.aB&doc=paper.4, "Pyrotechnic Fire Extinguishers," Navair-T2 Technology Transfer, printed May 18, 2009.

Holland, G. et al., "Sustainable Fire Protection for Millitary Vehicle and Aircraft Applicaitons," Suppression and Detection Research and Applicaitons—A Technical Working Conference, Orlando, Florida, Mar. 11-13, 2008 (12 pages).

International Search Report for PCT Application No. PCT/US2011/055106, mailed Oct. 18, 2012.

U.S. Appl. No. 60/414,157, filed Sep. 28, 2002, to Joseph Michael Bennett, entitled, "In-Room Gas Generator Fire Protection System.".

Berezovsky, "Pyrogen, A Revolution in Fire Suppression Technology?", Fire Safety Engineering, vol. 5, No. 5, Oct. 1998, pp. 30-32.

Ebeling, Hans, et al., "Development of Gas Generators for Fire Extinguishing," Propellants, Explosives, Pyrotechnics, vol. 22, pp. 170-175, 1997.

Engelen, K., et al., "Pyrotechnic Propellant for Nitrogen Gas Generator," Bull. Soc. Chim Belg., vol. 106, No. 6, pp. 349-354, 1997.

Fallis, Stephen, et al., "Advanced Propellant/Additive Development for Fire Suppressing Gas Generators: Development + Test," Proceedings of HOTWC-2002 12th Halon Options Technical Working Conference, Albuquerque, NM, Apr. 20-May 2, 2002, National Institute of Standards and Technology Special Publication 984.

Fletcher M., "Fighting Fire with Fire," Eureka (Inc. Engineering Materials and Design), Findlay Publications, Horton Kirby, Kent, GB, vol. 20, No. 1, Jan. 2000, p. 17, XP000877927, ISSN: 0261-2097 (Downloaded online version).

Mitchell, Robert M., Olin Aerospace Company, Report on Advanced Fire Suppression Technology (AFST) Research and Development Program, 52 pages, Report Date Sep. 1994.

Palaszewski, Bryan A., NASA Glenn Research Center, Safer Aircraft Possible with Nitrogen Generation, 2 pages, Mar. 2001.

"Pyrogen: The New Revolution in Fire Suppression Technology," International Aircraft Systems, Fire Protection Working Group, Atlantic City, NJ. Aug. 29, 2000, 43 pages.

Saito, Naoshi, et al., "Flame-extinguishing Concentrations and Peak Concentrations of N2, Ar, Co2 and their Mixtures for Hydrocarbon Fuels," Fire Safety Journal, vol. 27, pp. 185-200, 1996.

Schmid, Helmut, et al., "Gas Generator Development for Fire Protection Purpose," Propellants, Explosives, Pyrotechnics, vol. 24, pp. 144-148, 1999.

TNO Defence, Security and Safety, "Solid Propellant Cool Gas Generators," 2 pages, unknown publication date.

"Water Mist-Fire-Suppression Experiment," NASA Glenn Research Center, Dec. 2001, 3 pages.

Yang, Jiann C., et al., "Solid Propellant Gas Generators: An Overview and Their Application to Fire Suppression," International Conference on Fire Research and Engineering, Sep. 10-15, 1995, Orlando, FL, 3 pages.

Notification of the First Office Action, State Intellectual Property Office of the People's Republic of China, Application No. CN 201180048185.8, Sep. 3, 2014, 8 pages.

* cited by examiner

INFLATOR-BASED FIRE SUPPRESSION

BACKGROUND OF THE INVENTION

This invention relates generally to fire suppression and, more particularly, to fire suppression using an inflator-type gas generator device.

In the past, Halon halocarbons have found extensive application in connection with fire suppression. The term "Halon halocarbons" generally refers to haloalkanes, or halogenoalkanes, a group of chemical compounds consisting of alkanes with linked halogens and, in particular, to bromine-containing haloalkanes. Halon halocarbons are generally efficient in extinguishing most types of fires, desirably are electrically non-conductive, tend to dissipate rapidly without residue formation and to be relatively safe for limited human exposure. In the past, Halon halocarbons, such as the halocarbon Halon 1301 (bromotrifluoromethane, $CBrF_3$), have found utility as fire suppressants in or for areas or buildings typically not well suited for application of water sprinkler systems, areas such as data and computer centers, museums, libraries, surgical suites and other locations where application of water-based suppressants can result in irreparable damage to electronics, vital archival collections or the like.

Halon halocarbons, however, have been found to have a detrimental impact on the environment due to an ozone deleting aspect with respect to the atmosphere. Consequently, there is a need for effective alternatives to Halon halocarbons for fire suppression and similar applications.

SUMMARY OF THE INVENTION

There is provided an improved fire suppressing apparatus and associated or corresponding methods of or for fire suppression.

A more specific objective of the invention is to overcome one or more of the problems described above.

In a first aspect, there is provided a fire suppression apparatus that includes a housing at least in part defining a first chamber containing a quantity of gas generant. The apparatus further includes an initiator operatively associated with the first chamber and in reaction initiating communication with at least a portion of the quantity of gas generant. The initiator, upon actuation, acts or serves to ignite at least a portion of the quantity of gas generant to form gas. The housing further defines a second chamber adjacently disposed to the first chamber. The second chamber contains a quantity of an endothermically-alterable material and a piston assembly including a piston, wherein upon actuation, the piston moves to expel at least a portion of the quantity of endothermically-alterable material from the second chamber such that the expelled endothermically-alterable material contacts and cools gas formed by the ignition of the gas generant. The housing further has at least one discharge opening to permit cooled gas to exit the housing.

In another aspect, there is provided a method for suppressing a fire with or employing such a fire suppression apparatus.

In accordance with one such method of operation, at least a portion of the quantity of gas generant is ignited to form gas. The piston moves to expel at least a portion of the quantity of endothermically-alterable material from the second chamber such that the expelled endothermically-alterable material contacts and cools gas formed by the ignition of the gas generant. The cooled gas is then directed to an area of the fire.

Other objects and advantages will be apparent to those skilled in the art from the following detailed description taken in conjunction with the appended claims and drawings.

DESCRIPTION OF PREFERRED EMBODIMENTS

Figure 1:
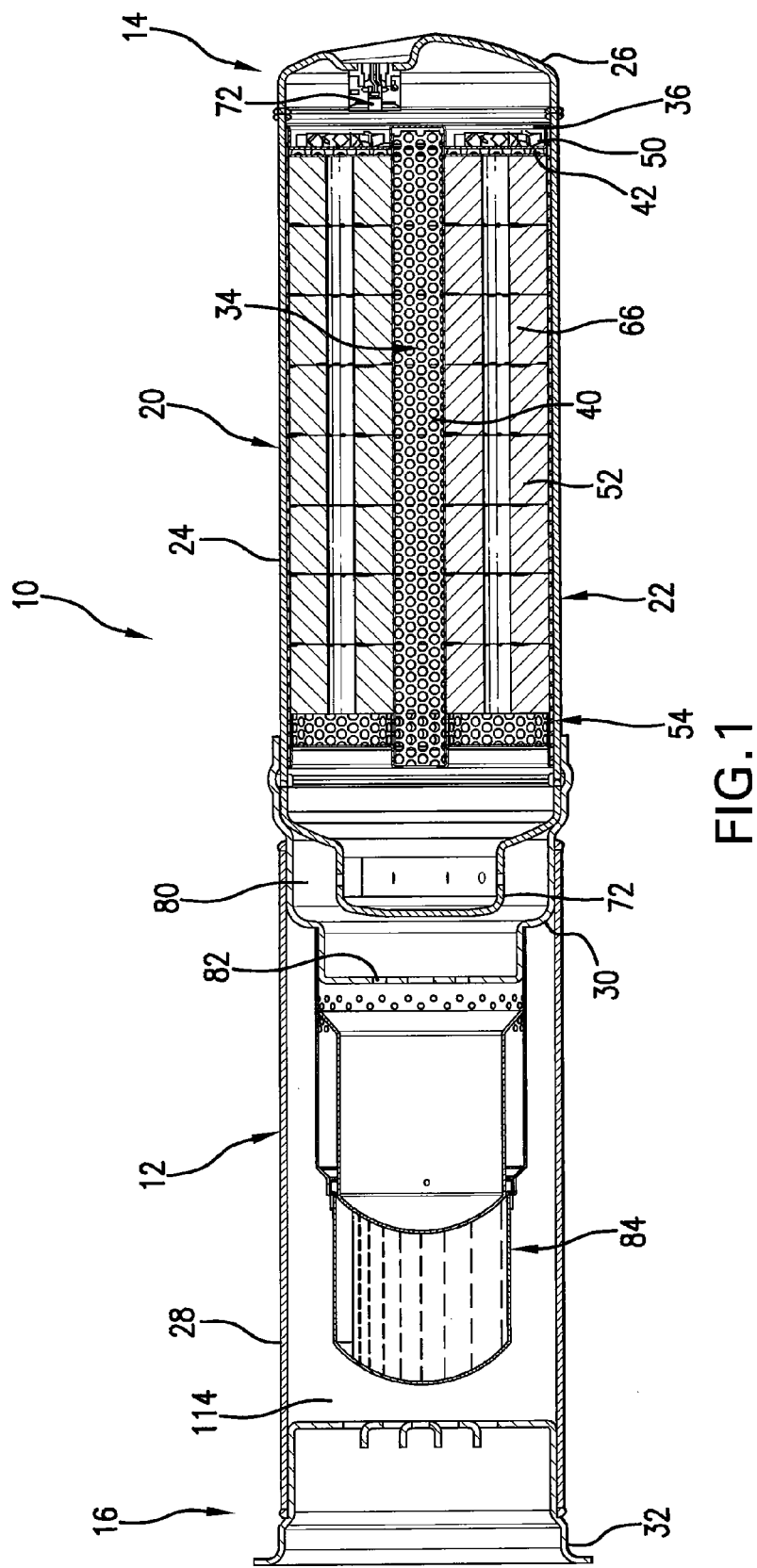
FIG. 1 is a sectional view of a fire suppression apparatus in accordance with one aspect of the invention.

FIGS. 1-6 illustrate a fire suppression apparatus and/or portions thereof, in accordance with one aspect of the invention. The fire suppression apparatus is generally designated with the reference numeral 10.

The fire suppression apparatus 10 has a generally cylindrical external outline and includes a generally cylindrical housing 12, such as having a tubular elongated form, and having opposed first and second ends, 14 and 16, respectively. The housing 12 may desirably be formed or made of metal or steel or other materials as may be desired for particular applications. The housing can be of a one-piece or multi-piece construction, as may be desired.

The fire suppression apparatus 10 includes a gas generator section, generally designated by the reference numeral 20 and includes, at least in part, a gas generator device 22. Various gas generator or inflator-type devices, such as similar to gas generator or inflator-type devices as may be employed in inflatable vehicular occupant safety restraint systems, can be used. A presently preferred gas generator device for use in the practice of the invention is disclosed in the copending U.S. patent application Ser. No. 12/900,011, now U.S. Pat. No. 8,162,350, issued Apr. 24, 2012, filed on even date herewith and incorporated in its entirety herein.

In the illustrated embodiment, the housing 12 is in part composed of a cylindrical wall 24 of the gas generator device 22 and the housing first end 14 is closed by a base end wall 26 of the gas generator device 22. The housing 12 further includes a hollow cylindrical sleeve 28, sometimes referred hereinafter as "an outer" sleeve. The sleeve 28 is joined in general longitudinal axis alignment with the gas generator device 22, such as via a connection element 30, as discussed in greater detail below.

An end closure or cap 32 is disposed at the housing second end 16. In the illustrated embodiment the end closure 32 is in press fit engagement with the cylindrical sleeve 28 at the housing second end 16. Those skilled in the art and guided by the teachings herein provided will, however, appreciate that various forms of end closure and attachment of end closures to a housing are contemplated and the broader practice of the invention is not necessarily limited by or to specific forms or means of attachment thereof to the housing.

Figure 2:
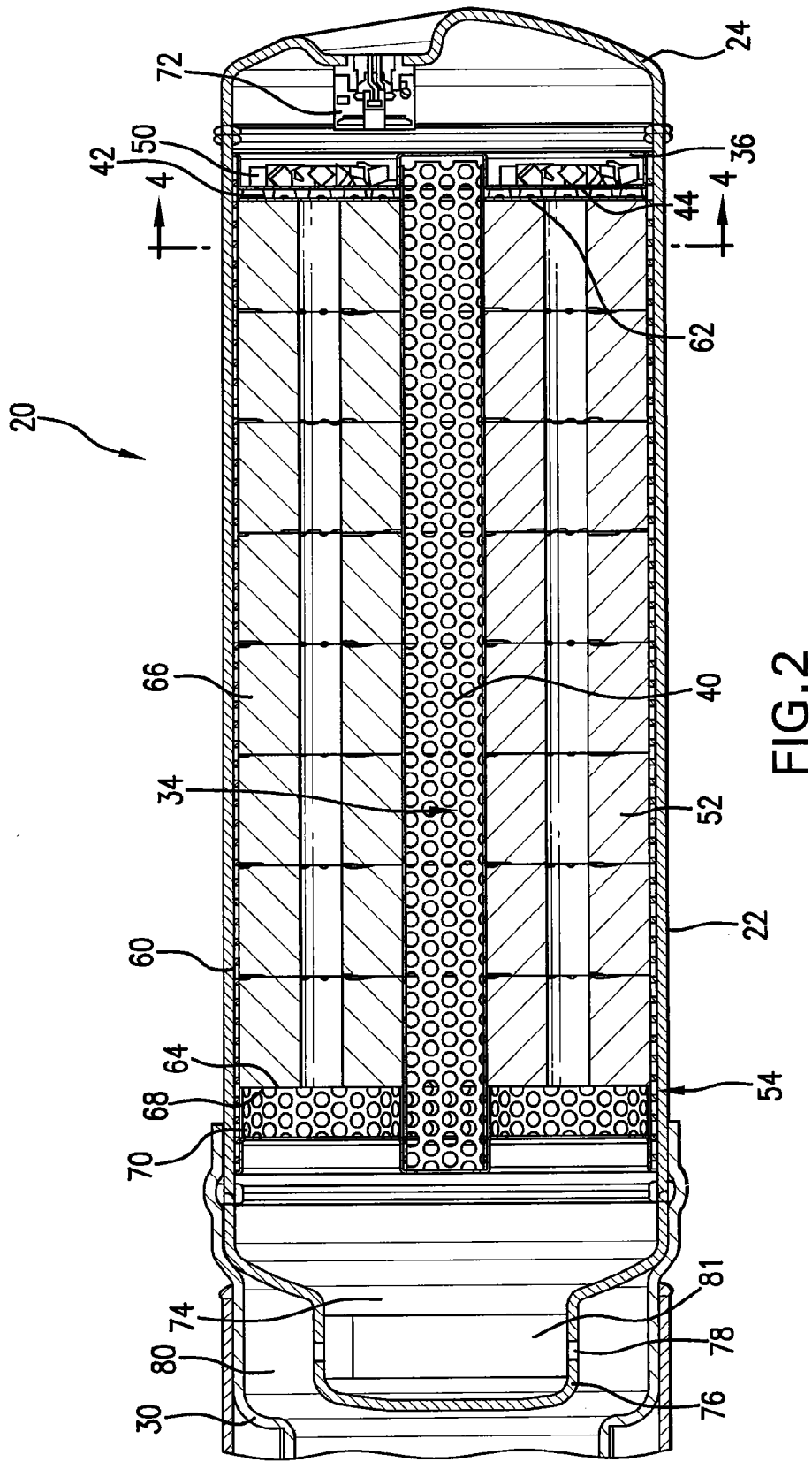
FIG. 2 is an enlarged fragmentary view of the generator section of the fire suppression apparatus shown in FIG. 1.
Figure 3:
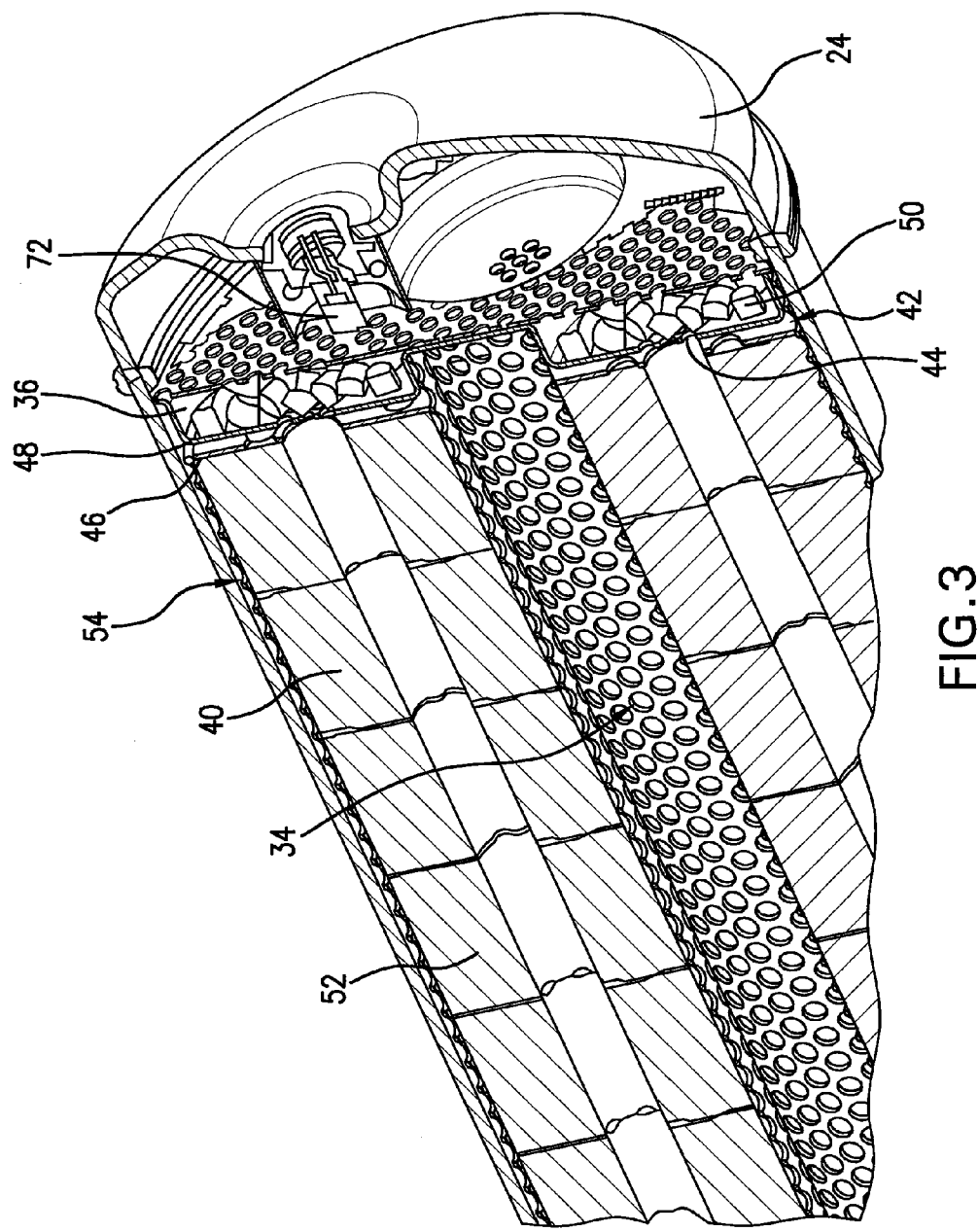
FIG. 3 is an enlarged fragmentary angled view of the generator section shown in FIG. 2 and looking toward the base (initiator end).

The housing 12 and, more particularly, at least a portion of the gas generator device 22, at least in part defines or includes a first chamber 34. Referring now more particularly to FIG. 2 and FIG. 3, the first chamber 34 is subdivided to include at least a first subchamber 36 and a second subchamber 40. More specifically, the first and second subchambers, 36 and 40, are separated by a bulkhead element 42, which includes a plurality of holes 44 therethrough such as to permit gas flow communication therethrough. In the illustrated embodiment, the bulkhead element 42 desirably includes a retainer disk 46 and a retainer plate 48, perhaps best viewed in FIG. 3.

As will be appreciated, the broader practice of the invention is not necessarily limited to constructions utilizing a bulkhead element for the separation of such first and second subchambers let alone to constructions including a retainer disk and a retainer plate, as shown. Those skilled in the art and guided by the teachings herein provided will further appreciate that separation of first and second subchambers can be effected by other suitable means or techniques such as may be employed in the practice of the invention.

The first subchamber 36 contains a quantity of an ignition material 50 such as known in the art and such as is reactable to form ignition products. Thus, the first subchamber 36 is sometimes referred to as an "ignition chamber" or, alternatively, as an "ignition cup." While the ignition material 50 is shown as being the form of tablets, those skilled in the art and guided by the teachings herein provided will appreciate that various forms of ignition material, such as known in the art, for example, can be used and thus the broader practice of the invention is not necessarily limited by or to the incorporation and/or the use of specific or particular forms of ignition material.

The second subchamber 40 contains a quantity of a gas generant material, generally designated by the reference numeral 52, such as known in the art and such as is reactable such as by combustion to form product gas. Thus, the second subchamber 40 is sometimes referred to as a "gas generant chamber" or a "combustion chamber." The gas generant chamber 40 desirably has a constant volume. That is, before, during, and after actuation of the gas generator device 22, the volume of the gas generant chamber 40 remains the same.

Figure 4:
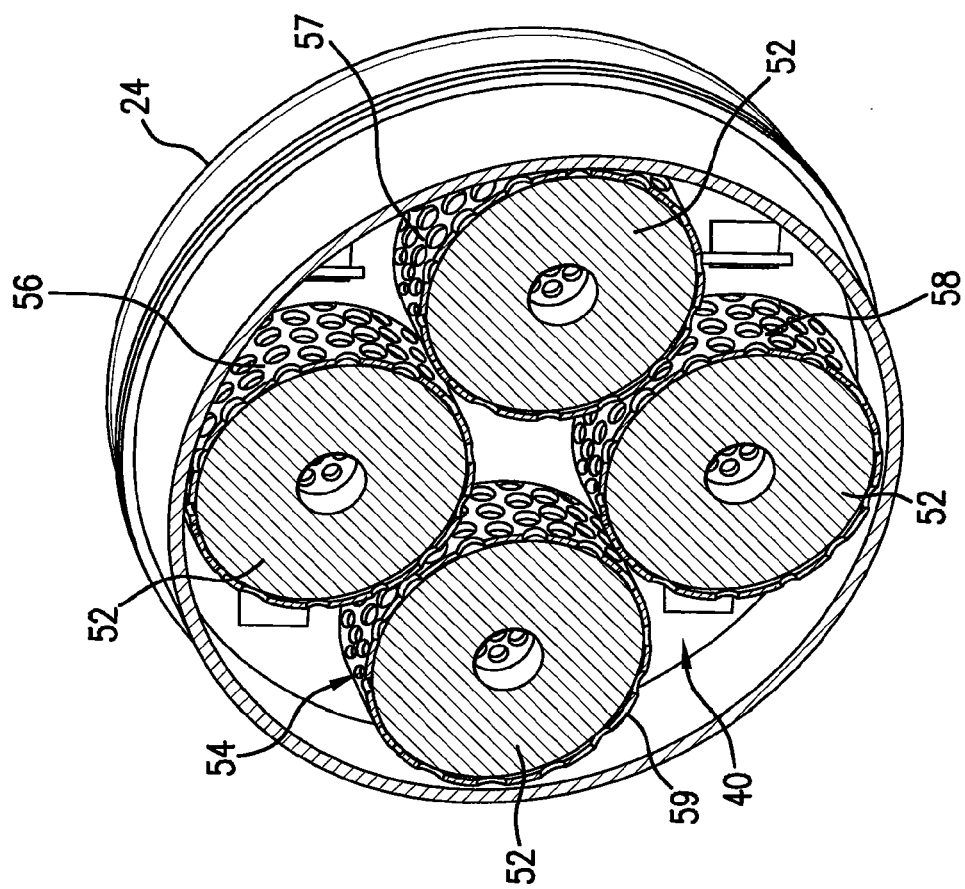
FIG. 4 is a sectional view of the gas generator section shown in FIG. 3, taken along the line 4-4 as shown in FIG. 2.
Figure 5:
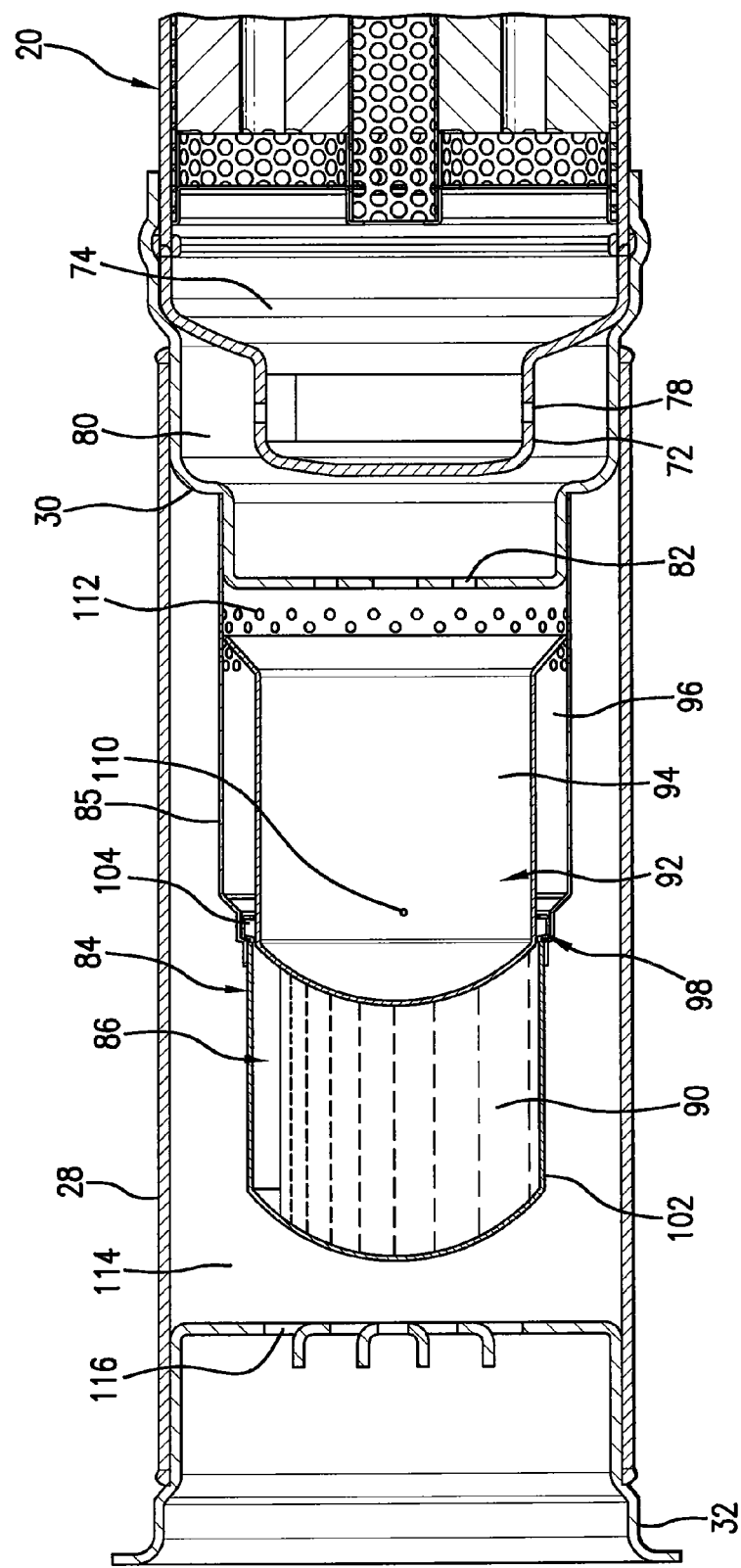
FIG. 5 is an enlarged fragmentary view highlighting the cooling section of the fire suppression apparatus shown in FIG. 1.

In the fire suppression apparatus 10, the gas generant material 52 is shown as housed within gas generant containers, generally designated by the reference numeral 54 and individually designated by the reference numerals 56, 57, 58, and 59, respectively, disposed within the gas generant chamber 40, as perhaps best seen by reference to FIG. 4. Returning to FIG. 2, the gas generant containers 54 each generally include an elongated cylindrical tube 60 and oppositely disposed first and second end walls, 62 and 64, respectively, with a plurality of gas generant material wafers 66 disposed therebetween. The cylindrical tubes 60 and the first and second end walls 62 and 64 can desirably each be perforated or otherwise formed or shaped to permit gas flow communication therethrough. The first end walls 62 are disposed adjacent the ignition chamber 36 to allow communication of at least a portion of the ignition products therethrough and into contact with the gas generant material 52 contained within the respective gas generant container 54 to ignite the gas generant material to produce a product gas. The first end walls 62 can be the same or different from the bulkhead element 42 and the retainer disk 46 and/or the retainer plate 48 discussed above.

The second end walls 64 are disposed to allow gas flow communication of the product gas therethrough for discharge from the gas generator 22. Thus, either or both the first end walls 62 and the second end walls 64 may be composed either or both of one or more retainer disks 46 and 68, respectively, and/or one or more retainer plates, 48 and 70, respectively, as may be desired and such as may each be perforated.

Those skilled in the art and guided by the teachings herein provided will appreciate that particular design features of such a gas generator device including, for example, the number, length and diameter of the gas generant containers 54 therein contained can be appropriately chosen to provide desired levels of gas production and performance.

Moreover, while the gas generant material 52 is shown as being the form of wafers, those skilled in the art and guided by the teachings herein provided will appreciate that various forms of gas generant material, such as known in the art, for example, can be used and thus the broader practice of the invention is not necessarily limited by or to the incorporation and/or the use of specific or particular forms of gas generant material.

The gas generator device 14 includes an initiator 72 operatively associated with the ignition chamber 36 in ignition communication with at least a portion of the quantity of the ignition material 50.

In the illustrated embodiment (see FIG. 2, for example), the initiator 72 is fixed to and extends from the base end wall 26. Common initiator devices employed in or with gas generator devices are electronically activated. As will be appreciated by those skilled in the art and guided by the teachings herein provided, placement or positioning of electrical connections such as may be required with or by such an initiator at or on a single end of the fire suppression apparatus can desirably facilitate or simplify the incorporation of such a fire suppression system in accordance with the invention, such as represented by the fire suppression apparatus, in various locations and structures.

The initiator 72, upon actuation, serves or acts to cause reaction of the ignition material 50 to form ignition products. As described above, the first end walls 62 of the gas generant containers 54 are disposed adjacent the ignition chamber 36 to allow communication of at least a portion of the ignition products therethrough and into contact with the gas generant material 52 contained within the respective gas generant containers 54 to ignite the gas generant material 52 to produce a product gas.

The product gas is passed through the second end walls 64 of the gas generant container 54 such as to allow gas flow communication of the product gas therethrough for discharge from the gas generator 22. To that end, the gas generator 22 includes a header section 74 having a header end wall 76 generally oppositely disposed to the base end wall 26. The header end wall 76 includes openings 78 wherethrough the product gas can exit the gas generator 22 and pass into a central chamber 80 formed between the connection element 30 and the header end wall 72 of the gas generator device 22. As will be appreciated by those skilled in the art and guided by the teachings herein provided, the openings 78 can normally (e.g., when the apparatus is in a static or prior to actuation state) desirably be sealed or covered such as by means of a pressure sensitive covering or barrier 81 such as to prevent undesired passage of materials through the openings 78. Such covering may, for example, take the form of an adhesive-backed foil band or the like. As is known, such covering can be selected to open or rupture upon the application of a predetermined pressure against the covering from the interior of the gas generator 22.

The central chamber 80 has one or more exit ports 82, as may be desired and as further described below.

The fire suppression apparatus 10 further includes a second chamber 84 generally adjacently disposed to the first chamber 34 and such as in gas flow communication therewith such as via the connection element 30. The second chamber 84 includes a generally cylindrical sleeve 85, sometimes referred to hereinafter as "an inner" sleeve, such as also appropriately joined to or connected with the connection element 30. The second chamber 84 at least in part contains or includes a sealed storage reservoir 86, such as to store or otherwise effectively contain a quantity of a coolant material 90, such as in the form of a liquid as described in greater detail below, a piston assembly 92, including a piston 94, and a diffuser section 96, such as formed in or as a part of sleeve 85.

As will be appreciated, the coolant material 90 is appropriately stored or contained within the second chamber 84. For example, the fire suppression apparatus 10 contains the coolant material 90 in a liquid form sealed within the sealed storage reservoir 86 with a seal 98. This seal 98 may, for example, be in the form of a cup 102 that is press fit around the piston 94 with the aid of an O-ring seal 104 to seal the storage reservoir 86.

Figure 6:
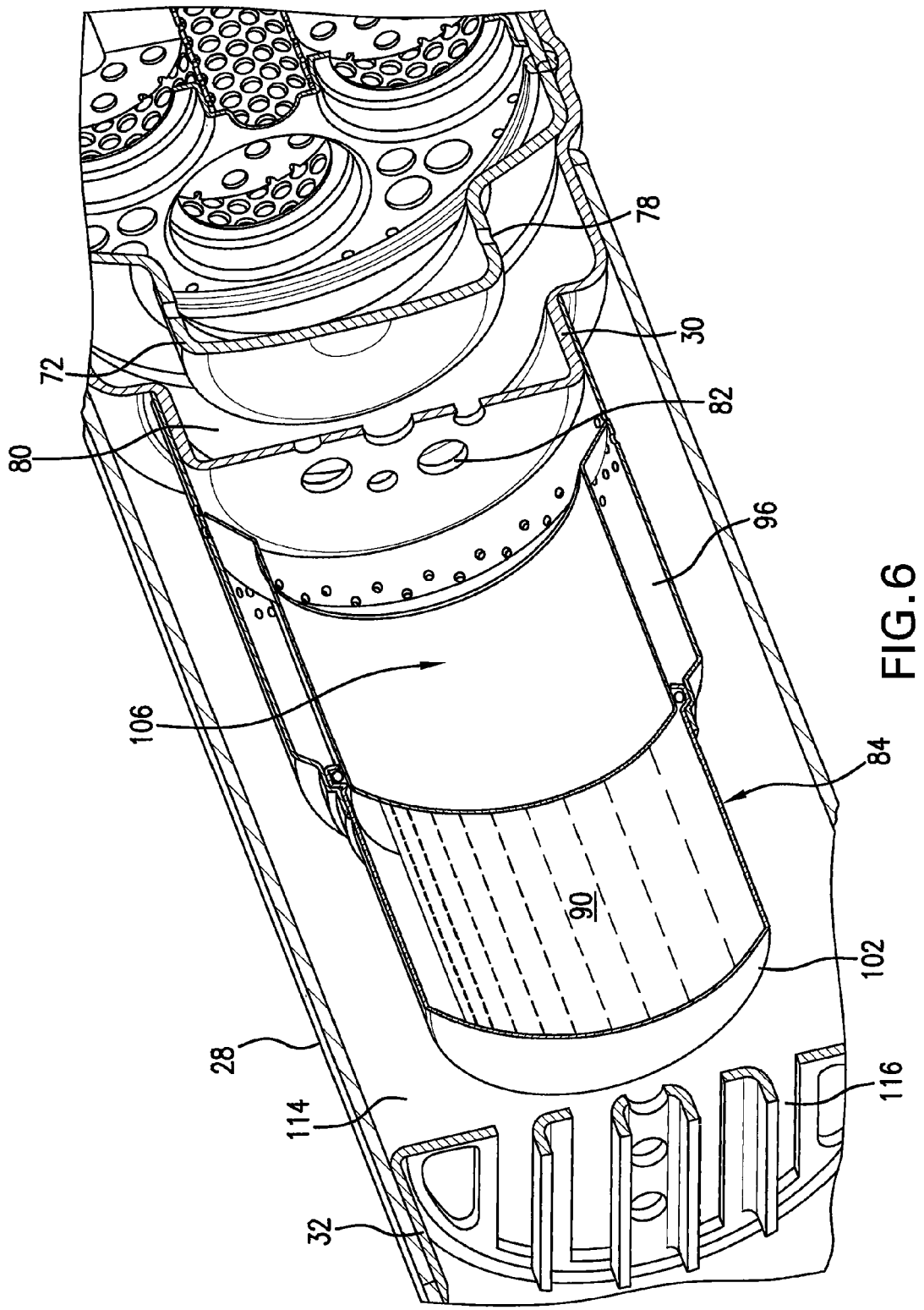
FIG. 6 is an enlarged fragmentary angled view of the cooling section highlighted in FIG. 5.

As perhaps best seen by reference to FIG. 6, the interior of the piston 94 is or forms a mixing chamber 106.

When the generant 52 is combusted, a quantity of gas is produced. This gas exits the gas generator 14 and passes to the central chamber 80. The gas subsequently exits the central chamber 80 via the exit ports 82 and may contact the piston 94 such as by at least in part filling the mixing chamber 106. As the gas contacts the piston 94, the piston 94 begins to move/displace towards the chamber 84, more specifically, towards the storage reservoir 86.

Once one or more of openings 110 in the piston 94 have been moved/displaced into the chamber 84, e.g., the storage reservoir 86, and past the O-ring seal 104, at least a portion of the quantity of coolant material 90 will begin to flow out of the storage reservoir 86 through the piston openings 110. Thus, such movement of the piston 94 can serve to hydraulically expel at least a portion of the quantity of coolant material 90 from the second chamber 84 and, more specifically, the storage reservoir 86, thereby causing coolant material 90 to inject through the openings 110 for contact and mixing with the gas generant combustion product gas in the mixing chamber 106. The liquid coolant material 90 injected into the interior of the piston 94 can be vaporized. Such vaporization operates to cool the gas generant combustion product gas and can desirably serve to form additional gaseous products. As the piston 94 advances into chamber 84, the gas produced can exit via openings 112 such as formed in the diffuser section 96.

It should be noted that, in some embodiments, the gas generant combustion product gas will push against the head of the piston as a means of moving the piston. As the gas generant combustion product gas exits the gas generator device 22, particulates and other undesirable byproducts included in or with the product gas can be deposited onto a surface of one or more of the connection element 30, the sleeve 85, the piston assembly 92, such as the piston head, and the end closure 32 and thus desirably be separated from the quantity of gas generant combustion product gas. Thus, desirably avoiding or minimizing dispersal of such particulates and byproducts in or with the discharge from the apparatus.

The cylindrical sleeve 28 portion of the housing 12 at least in part defines a third chamber 114 such as generally disposed externally about the second chamber 84. As a result, the gas exiting via the diffuser section openings 112 can be directed via the cylindrical sleeve 28 and out of the fire suppression apparatus 10 through discharge openings 116 such as formed or included in the end closure 32, at the housing end 16. The discharge openings 116 are normally (e.g., when the apparatus is in a static or prior to actuation state) sealed by means of foil band (not shown) or the like such as to prevent passage of dirt or other undesired materials from entering the system. The discharged gas can be appropriately directed at or onto an area of a fire to effect or assist in effecting desired suppression of such fire.

Those skilled in the art and guided by the teachings herein provided will appreciate that various suitable coolant materials can be used in the practice of the invention are herein encompassed. In one preferred embodiment, the coolant material is, includes or contains at least one endothermically-alterable material. In one preferred form the endothermically-alterable material is or includes a liquid that either or both vaporizes and/or decomposes upon contact with the gas formed by the ignition of the gas generant to at least cool the gas.

In some embodiments, the endothermically-alterable material preferably endothermically decomposes to form additional gaseous products such as to increase the resulting quantity of gaseous products and such as may desirably serve to reduce the amount or quantity of the gas generant material, required for proper functioning of the fire suppression apparatus. By reducing the required amount or quantity of gas generant material and hence the volume of required gas generant material, the size of the gas generator component of the fire suppression apparatus can be significantly reduced, thus serving to significantly reduce either or both the cost and size of the fire suppression apparatus or, alternatively, serving to significantly increase the fire suppression capability of the fire suppression apparatus or associated fire suppression system.

In practice, suitable such coolants include liquid materials that remain a liquid at temperatures between $-35°$ C. and $85°$ C. Further, any gases produced or formed from the coolant must be within acceptable effluent limits associated with particular fire suppression applications. Also, the coolant desirably is non-corrosive to facilitate storage in a simple chamber. Examples of coolants, particularly coolant liquids that generally meet such criteria include water mixed with $CaCl_2$ and water mixed with propylene glycol. As will be appreciated, such coolants are generally less expensive and, in many cases, significantly less expensive than materials most commonly used in fire suppression device applications.

In addition to or as a part of the coolant, the second chamber may contain or include one or more active fire suppression compounds such as are generally useful for or effective to suppress a fire upon contact therewith. Examples of chemically active fire suppression compounds that can be used include potassium acetate and alkali metal bicarbonates.

For example, the addition of a solution of 30% by weight potassium acetate in water can reduce the gas generant load and combustion chamber size and weight of a subject fire suppression apparatus by about 40% without significantly changing either the size of the liquid chamber, e.g., the second chamber, and fire suppression capability of the device or apparatus, as compared to an otherwise similar device or apparatus without the inclusion of the potassium acetate solution.

Figure 7:
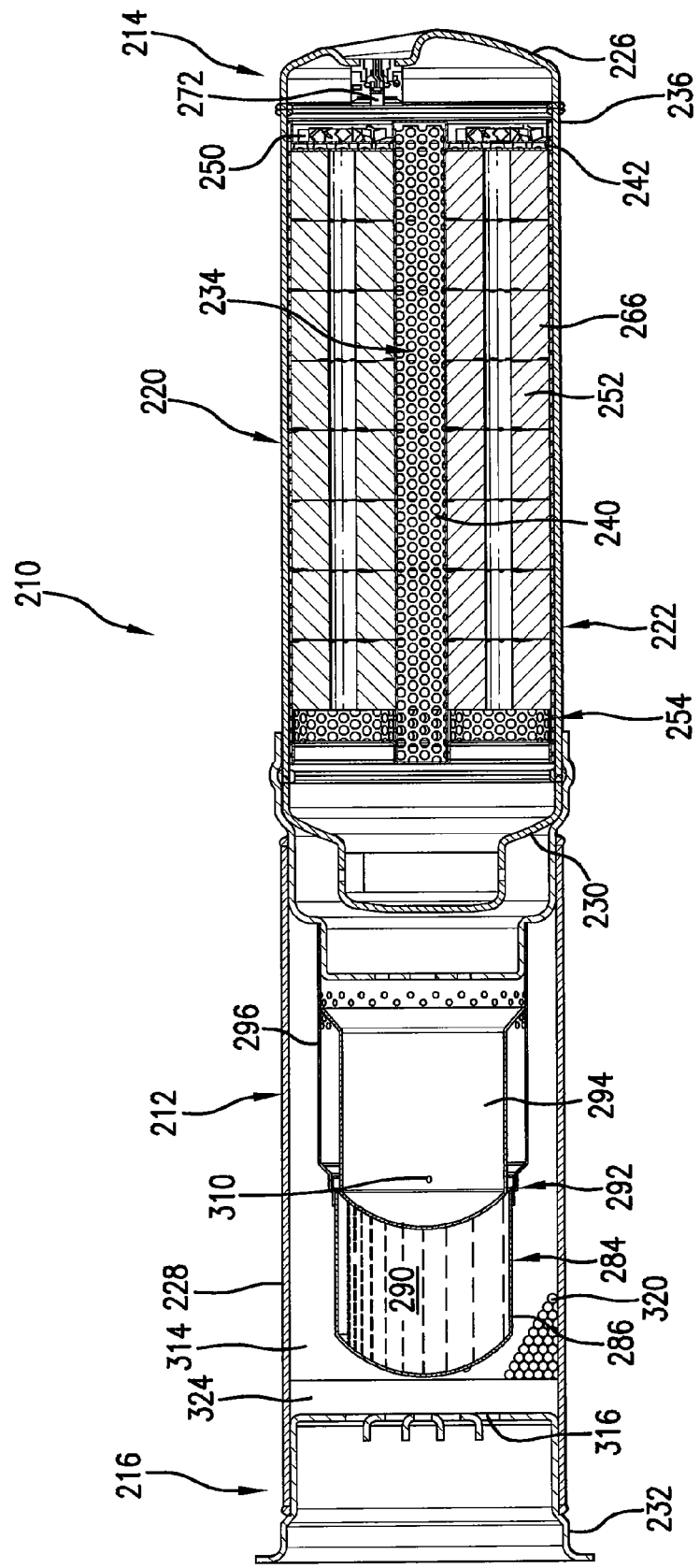
FIG. 7 is a sectional view, similar to the view shown in FIG. 1, of a fire suppression apparatus in accordance with another aspect of the invention.

Turning now to FIG. 7, there is illustrated a fire suppression apparatus, generally designated with the reference numeral 210, in accordance with another embodiment of the invention.

The fire suppression apparatus 210 is in various respects similar to the fire suppression apparatus 10, described above.

For example, the fire suppression apparatus 210, similar to the fire suppression apparatus 10, has a generally cylindrical external outline including a generally cylindrical housing 212 having opposed first and second ends, 214 and 216, respectively. The fire suppression apparatus 210 also similarly includes a gas generator section, generally designated by the reference numeral 220 and includes, at least in part, a gas generator device 222. The housing 212 further includes a hollow cylindrical sleeve 228. The sleeve 228 is joined in general longitudinal axis alignment with the gas generator device 222, such as via a connection element 230. An end closure or cap 232 is disposed at the housing second end 216 such as in press fit engagement with the cylindrical sleeve 228 at the housing second end 216.

The housing 212 and, more particularly, at least a portion of the gas generator device 222, at least in part defines or includes a first chamber 234. The first chamber 234 is subdivided to include at least a first subchamber 236 and a second subchamber 240, for example, separated by a bulkhead element 242, which includes a plurality of holes therethrough such as to permit gas flow communication therethrough. The first subchamber 236, sometimes referred to as an "ignition chamber," contains a quantity of an ignition material 250 such as known in the art and such as is reactable to form ignition products. The second subchamber 240, sometimes referred to as a "gas generant chamber" or a "combustion chamber," contains a quantity of a gas generant material 252 such as is reactable to form product gas.

In the fire suppression apparatus 210, similar to the fire suppression apparatus 10, the gas generant material 252 is housed within gas generant containers, generally designated by the reference numeral 254. As with the previously described gas generant containers 54, the gas generant containers 254 may each include an elongated cylindrical tube and oppositely disposed first and second end walls with a plurality of gas generant material wafers 266 disposed therebetween.

The gas generator device 214 also includes an initiator 272, such as fixed to and extending from a base end wall 226, operatively associated with the ignition chamber 236 in ignition communication with at least a portion of the quantity of the ignition material 250.

The fire suppression apparatus 210 further also includes a second chamber 284 generally adjacently disposed to the first chamber 234 and such as in gas flow communication therewith such as via the connection element 230. The second chamber 284 at least in part contains or includes a sealed storage reservoir 286, such as to store or otherwise effectively contain a quantity of a coolant material 290, such as described above, a piston assembly 292, including a piston 294, and a diffuser section 296. The coolant material 290 can again be appropriately stored or contained within the second chamber 284. The interior of the piston 294 is or forms a mixing chamber.

As with the fire suppression apparatus 10, once one or more of openings 310 in the piston 294 have been appropriately moved/displaced into the chamber 284, e.g., the storage reservoir 286, at least a portion of the quantity of coolant material 290 will begin to flow out of the storage reservoir 286 through the piston openings 310.

The cylindrical sleeve 228 portion of the housing 212 also, at least in part, defines a third chamber 314 such as generally disposed externally about the second chamber 284, with gas exiting the fire suppression apparatus 210 through discharge openings 316 such as formed or included in the end closure 232, at the housing end 216. The discharged gas can be appropriately directed at or onto an area of a fire to effect or assist in effecting desired suppression of such fire.

A significant difference between the fire suppression apparatus 210 and the fire suppression apparatus 10 is that, in the fire suppression apparatus 210, the third chamber 314 desirably additionally includes or contains a quantity of a thermally-stable heat sink material solid 320. The thermally-stable heat sink material solid 320 desirably can serve to absorb or otherwise remove heat from the product gas prior to discharge from the apparatus 310. The thermally-stable heat sink material solid 320 can also desirably serve to trap or otherwise prevent residue (e.g., particulates) such as may be present in the product gas from exiting the apparatus 310.

In accordance with one preferred embodiment, a suitable thermally-stable heat sink material solid material can be in the form of small diameter metal shot such as in the nature of or similar to the air shot rifle pellets known as "BBs." Such small diameter metal shot can be formed of zinc-plated steel in 0.177 caliber (4.5 mm) measuring 0.171 inches to 0.173 inch (4.4 mm) in diameter.

Other possible heat sink solids include: dolomite rocks (such as in small aggregate form), zeolite (such as in small aggregate form) and hydrated molecular sieves (such as in the form of small round spheres), for example.

The fire suppression apparatus 210 may also desirably contain or include a screen 324 or other selected retainer device to retain or assist in retaining the heat sink material solid within the third chamber upon exit of the cooled gas from the housing. As shown, the screen can desirably be disposed internally adjacent the discharge openings 316 to retain or assist in retaining the heat sink material solid 320 within the third chamber 314 upon exit of the cooled gas from the apparatus. The screen 324 or appropriate other selected retainer device can also desirably serve to help cool as well as trap or otherwise remove particulates from the gas coming into contact therewith.

While the above-described embodiments incorporate or employ both an outer and an inner cylindrical sleeve and produce or employ an axial discharge of gas from a respective fire suppression apparatus, those skilled in the art and guided by the teachings herein provided will appreciate that the broader practice of the invention is not necessarily so limited.

Figure 8:
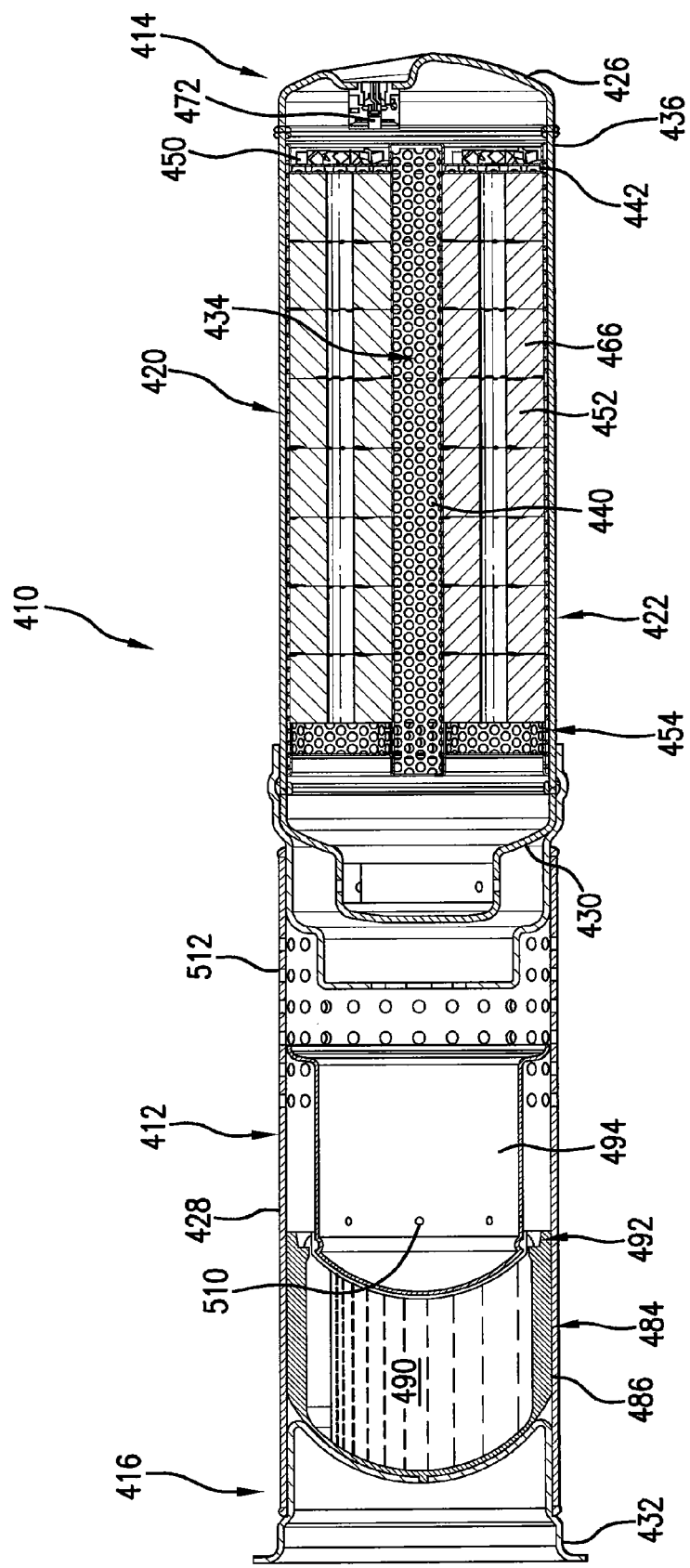
FIG. 8 is a sectional view, similar to the views shown in FIGS. 1 and 7, of a fire suppression apparatus in accordance with yet another aspect of the invention.

For example, FIG. 8 illustrates a fire suppression apparatus, generally designated with the reference numeral 410, in accordance with another embodiment of the invention and that employs a single cylindrical sleeve construction and wherein, as described in greater detail below, the gas is discharged from the apparatus 410 in a radial fashion.

The fire suppression apparatus 410, similar to the fire suppression apparatus 10, has a generally cylindrical external outline including a generally cylindrical housing 412 having opposed first and second ends, 414 and 416, respectively. The fire suppression apparatus 410 also similarly includes a gas generator section, generally designated by the reference numeral 420 and such as includes at least in part a gas generator device 422.

The housing 412 further includes a hollow cylindrical sleeve 428 joined in general longitudinal axis alignment with the gas generator device 422, such as via a connection element 430. An end closure or cap 432 is disposed at the housing second end 416 such as in press fit engagement with the cylindrical sleeve 428 at the housing second end 416.

The housing 412 and, more particularly, at least a portion of the gas generator device 422, at least in part defines or includes a first chamber 434 such as subdivided to include at least a first subchamber 436 and a second subchamber 440, such as separated by a bulkhead element 442 that, for example, includes a plurality of holes therethrough, such as to permit gas flow communication therethrough similar to as described above. The first subchamber 436, sometimes referred to as an "ignition chamber," contains a quantity of an ignition material 450 such as known in the art and such as is reactable to form ignition products. The second subchamber 440, sometimes referred to as a "gas generant chamber" or a "combustion chamber," contains a quantity of a gas generant material 452 such as is reactable to form product gas.

The gas generant material 452 is housed within gas generant containers, generally designated by the reference numeral 454. Similar to the previously described gas generant containers 54, the gas generant containers 454 may each include an elongated cylindrical tube and oppositely disposed first and second end walls with a plurality of gas generant material wafers 466 disposed therebetween.

The gas generator device 414 also includes an initiator 472, such as fixed to and extending from a base end wall 426, operatively associated with the ignition chamber 436 in ignition communication with at least a portion of the quantity of the ignition material 450.

The fire suppression apparatus 410 further also includes a second chamber 484 generally adjacently disposed to the first chamber 434 and such as in gas flow communication therewith such as via the connection element 430. The second chamber 484 at least in part contains or includes a sealed storage reservoir 486, such as to store or otherwise effectively contain a quantity of a coolant material 490, such as described above, a piston assembly 492, including a piston 494, and a diffuser section 496. The coolant material 490 can again be appropriately stored or contained within the second chamber 484. The interior of the piston 494 is or forms a mixing chamber 506.

As with the fire suppression apparatus 10, once one or more of openings 510 in the piston 494 have been appropriately moved/displaced into the chamber 484, e.g., the storage reservoir 486, at least a portion of the quantity of coolant material 490 will begin to flow out of the storage reservoir 486 through the piston openings 510.

A significant difference between the fire suppression apparatus 410 and the fire suppression apparatus 10 is that the cooled gas passing through openings 512 such as formed in the diffuser section 496 exit from the apparatus 410 in a radial manner and can be appropriately directed at or onto an area of a fire to effect or assist in effecting desired suppression of such fire. For example, such radial discharge can provide or result in a more diffuse exhausting of the cooled gas from the apparatus such as provide better distribution or dispersal of the cooling gas onto or at a fire.

Those skilled in the art and guided by the teachings herein provided will understand and appreciate that radial discharge of cooling gas, such as provided or resulting from the fire suppression apparatus 410, can desirably result in an apparatus that is thrust neutral, such as can facilitate or simplify product shipping classification testing.

Also provided are methods for suppressing a fire with or employing fire suppression apparatuses such as described above.

In accordance with one such method of operation, at least a portion of the quantity of gas generant is ignited to form gas. The piston moves to expel at least a portion of the quantity of endothermically-alterable material from the second chamber such that the expelled endothermically-alterable material contacts and cools gas formed by the ignition of the gas generant. The cooled gas is then directed to an area of the fire.

In at least one such method, the combustion pressure from the igniting of the gas generant to form gas acts to inject the endothermically-alterable material into a stream of gas formed by the ignition of the gas generant.

In at least one such method, the endothermically-alterable material is expelled from the second chamber at a rate proportional to the combustion pressure within the first chamber.

In at least one such method, the endothermically-alterable material is a liquid. Further, at least a portion of the liquid endothermically-alterable material can vaporize upon contact with the gas formed by the ignition of the gas generant to form additional gas products.

In at least one such method, at least a portion of the endothermically-alterable material decomposes upon contact with the gas formed by the ignition of the gas generant to form additional gas products.

In at least one such method, wherein the igniting of at least a portion of the quantity of gas generant to form gas occurs in the first chamber, the method additionally includes the formed gas following a tortuous gas flow passage from the first chamber to the at least one discharge opening.

In at least one such method, the second chamber additionally contains at least one active fire suppression compound to suppress fire upon contact therewith. In at least one such method, the at least one active fire suppression compound comprises potassium acetate. In another such method, the at least one active fire suppression compound comprises at least one alkali metal bicarbonate.

In at least one such method, wherein the housing is longitudinally extending, the method involves axially discharging the cooled gas from the housing.

In at least one such method, wherein the housing additionally at least in part defines a third chamber and the second chamber is at least in part disposed within the third chamber, and wherein prior to directing the cooled gas to an area of the fire the method additionally includes contacting the gas formed by the ignition of the gas generant with a thermally-stable heat sink material solid disposed within the third chamber to cool the gas formed by the ignition of the gas generant prior to exit from the housing.

In at least one such method, the directing of the cooled gas to an area of the fire involves radially discharging the cooled gas from the housing.

The invention illustratively disclosed herein suitably may be practiced in the absence of any element, part, step, component, or ingredient that is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A fire suppression apparatus, comprising:
   a housing comprising apertures adjacent an end thereof;
   a plurality of longitudinally extending, mutually laterally spaced gas generant containers within the housing, each gas generant container comprising apertures between an interior and an exterior thereof and containing a quantity of gas generant;
   ignition material within the housing adjacent a common end of the plurality of gas generant containers;
   an initiator operatively associated with the ignition material adjacent an opposing end of the housing;
   another housing longitudinally adjacent to the housing and in communication with the apertures adjacent the end of the housing, the other housing comprising a chamber defining a reservoir at an end thereof and a plurality of apertures through a sidewall thereof adjacent an opposing end thereof, the reservoir containing a quantity of a coolant material; and a piston having a face in peripheral sealing contact with a mouth of the reservoir, wherein responsive to pressure of gas generated by combustion of the gas generant and in communication with the piston through the apertures of the housing, the piston is movable into the reservoir to expel at least a portion of the quantity of coolant material from the reservoir to contact and cool the pressurized gas.

2. The fire suppression apparatus of claim 1, wherein an exterior of the chamber and an interior of the another housing define an annular space therebetween laterally adjacent the plurality of apertures through the chamber sidewall, and the another housing comprises at least one discharge opening in communication with the annular space.

3. The fire suppression apparatus of claim 1, wherein the coolant material comprises at least one endothermically-alterable material.

4. The fire suppression apparatus of claim 3, wherein the at least one endothermically-alterable material comprises a liquid that at least one of vaporizes and decomposes upon contact with the gas formed by the ignition of the gas generant to at least cool said gas.

5. The fire suppression apparatus of claim 4, wherein the at least one endothermically-alterable material forms additional gas products upon contact with the gas formed by the ignition of the gas generant.

6. The fire suppression apparatus of claim 3, wherein the at least one endothermically-alterable material comprises water.

7. The fire suppression apparatus of claim 6, wherein the at least one endothermically-alterable material additionally comprises calcium chloride.

8. A fire suppression apparatus, the apparatus comprising:
a housing at least in part defining a first chamber containing a quantity of gas generant disposed in a plurality of longitudinally extending, mutually laterally spaced perforated sleeves;
an initiator operatively associated with the first chamber and in reaction initiating communication with an igniter material adjacent a portion of the quantity of gas generant;
a second chamber located adjacent to and in communication with the first chamber, the second chamber comprising a plurality of apertures through a sidewall thereof and a reservoir longitudinally spaced from the plurality of apertures and containing a quantity of a coolant material; and
a piston assembly including a hollow piston in peripheral sealing contact with an interior surface of the reservoir, wherein the coolant material comprises at least one endothermically-alterable material, wherein responsive to pressure of a gas generated by combustion of the gas generant, the piston is movable into the reservoir to cause at least a portion of the quantity of coolant material to be expelled from the reservoir to contact and cool the pressurized gas.

9. The fire suppression apparatus of claim 8, additionally comprising a tortuous gas flow passage for gas flow communication from the first chamber to the at least one discharge opening.

10. The fire suppression apparatus of claim 9, wherein the tortuous gas flow passage comprises a plurality of gas flow turns.

11. The fire suppression apparatus of claim 2, wherein the another housing is longitudinally extending and the at least one discharge opening is located to permit cooled gas to axially exit the housing.

12. A fire suppression apparatus, the apparatus comprising:
a housing at least in part defining a first chamber containing a quantity of gas generant;
an initiator operatively associated with the first chamber and in reaction initiating communication with at least a portion of the quantity of gas generant to ignite at least a portion of the quantity of gas generant to form gas;
a second chamber adjacently disposed to the first chamber, the second chamber containing a quantity of a coolant material and a piston assembly including a piston, wherein upon actuation, the piston is movable to expel at least a portion of the quantity of coolant material from the second chamber to contact and cool gas formed by the ignition of the gas generant; and
the housing further having at least one discharge opening to permit cooled gas to exit the housing and wherein the housing additionally at least in part defines a third chamber and wherein the second chamber is at least in part disposed within the third chamber, the third chamber containing a quantity of a thermally-stable heat sink material solid and a retainer device disposed internally adjacent the at least one discharge opening to retain the heat sink material solid within the third chamber upon exit of the cooled gas from the housing.

13. The fire suppression apparatus of claim 1, wherein the plurality of apertures through the chamber sidewall is located to permit cooled gas to radially exit the another housing.

14. The first suppression apparatus of claim 8, wherein the housing is longitudinally extending, an exterior of the second chamber and an interior of the housing laterally adjacent the plurality of apertures define an annular space, and further comprising at least one discharge opening is located to permit cooled gas within the annular space to axially exit the housing.

15. The fire suppression apparatus of claim 12, wherein the housing is longitudinally extending and the at least one discharge opening is located to permit cooled gas to axially exit the housing.

16. The fire suppression apparatus of claim 1, wherein the reservoir additionally contains at least one active fire suppression compound to suppress fire upon contact therewith.

17. The fire suppression apparatus of claim 16, wherein the at least one active fire suppression compound is potassium acetate or at least one alkali metal bicarbonate.

18. The fire suppression apparatus of claim 8, wherein the endothermically-alterable material comprises water and propylene glycol.

19. The fire suppression apparatus of claim 8, wherein the plurality of apertures are located to permit cooled gas to radially exit the housing therethrough.

* * * * *

UNITED STATES PATENT AND TRADEMARK OFFICE
CERTIFICATE OF CORRECTION

PATENT NO. : 8,939,225 B2  
APPLICATION NO. : 12/899961  
DATED : January 27, 2015  
INVENTOR(S) : Matthew A. Cox et al.

Page 1 of 1

It is certified that error appears in the above-identified patent and that said Letters Patent is hereby corrected as shown below:

In the specification:
    COLUMN 8,   LINE 19,    change "0.171 inches" to --0.171 inch--

Signed and Sealed this  
Fifteenth Day of September, 2015

Michelle K. Lee  
*Director of the United States Patent and Trademark Office*